US008019159B2

(12) United States Patent
Kim et al.

(10) Patent No.: US 8,019,159 B2
(45) Date of Patent: Sep. 13, 2011

(54) METHOD AND APPARATUS FOR INFORMING USER OF IMAGE RECOGNITION ERROR IN IMAGING SYSTEM

(75) Inventors: Hyun-Soo Kim, Yongin-si (KR); Je-Han Yoon, Seongnam-si (KR)

(73) Assignee: Samsung Electronics Co., Ltd. (KR)

( * ) Notice: Subject to any disclaimer, the term of this patent is extended or adjusted under 35 U.S.C. 154(b) by 989 days.

(21) Appl. No.: 11/860,256

(22) Filed: Sep. 24, 2007

(65) Prior Publication Data

US 2008/0075378 A1 Mar. 27, 2008

(30) Foreign Application Priority Data

Sep. 22, 2006 (KR) ........................ 10-2006-0092448

(51) Int. Cl.
*G06K 9/00* (2006.01)

(52) U.S. Cl. ........................................................ 382/181

(58) Field of Classification Search .......... 382/115-127, 382/181-202

See application file for complete search history.

(56) References Cited

U.S. PATENT DOCUMENTS 7,203,344 B2 * 4/2007 McClurg et al. .............. 382/115

FOREIGN PATENT DOCUMENTS

| | | |
|---|---|---|
| KR | 1019990037927 | 5/1999 |
| KR | 1019990064414 | 8/1999 |
| KR | 1020020061375 | 7/2002 |
| KR | 1020060027481 | 3/2006 |

* cited by examiner

*Primary Examiner* — Daniel Mariam
*Assistant Examiner* — Elisa Rice
(74) *Attorney, Agent, or Firm* — The Farrell Law Firm, P.C.

(57) ABSTRACT

Disclosed is a method and an apparatus for informing a user of an image recognition error in an imaging system. The method includes detecting environmental factors causing errors of image recognition when image recognition is requested by the user, calculating analysis indices corresponding to the environmental factors, perceiving whether image recognition is suitably performed by checking whether the analysis indices are included in a normal range of predetermined reference values, and informing the user of the suitability or the unsuitability of image recognition.

10 Claims, 7 Drawing Sheets

203 COMMUNICATION UNIT
205 IMAGE PROCESSING UNIT
207 IMAGE ANALYZING UNIT
201 CONTROL UNIT
213 DISPLAY UNIT
211 MEMORY UNIT
209 CAMERA UNIT

METHOD AND APPARATUS FOR INFORMING USER OF IMAGE RECOGNITION ERROR IN IMAGING SYSTEM

PRIORITY

This application claims the benefit under 35 U.S.C. §119 (a) of an application entitled "Method And Apparatus For Informing User Of Image Recognition Error In Imaging System" filed in the Korean Industrial Property Office on Sep. 22, 2006 and assigned Serial No. 2006-92448, the contents of which are incorporated herein by reference.

BACKGROUND OF THE INVENTION

1. Field of the Invention

The present invention relates generally to image processing, and more particularly to a method and an apparatus for informing a user of causes of errors incurred in the process of image recognition by an imaging system.

2. Description of the Related Art

Generally, image recognition establishes with image data a region-of-interest including feature image data needed for image recognition, segments image data corresponding to a set region-of-interest, compares segmented image data with previously stored image data for image recognition, and performs a function of image recognition.

FIG. 1 the conventional image recognition. In step 101, if image recognition is requested by a user, then an imaging system receives image data which includes an object of recognition, and proceeds to step 103. If image recognition is not requested by the user, the procedure repeats step 101. In step 103, the imaging system eliminates noise of the image data, and adjusts the luminosity of the image data to be suitable for image recognition. In step 105, the imaging system searches the image data for the region-of-interest including the object of recognition, segments the picture image by an amount of a searched region-of-interest, and extracts feature image data needed for image recognition from a segmented picture image. In step 107, the image system performs image recognition using the feature image data of input image data. In more detail, the image system extracts feature image data from the image data which has been previously stored. Then the image system compares the feature image data of input image data with the feature image data of previously stored image data, and searches for the previously stored image data which is most similar to the feature image data of input image data. The image system recognizes a user image corresponding to the found image data as the image of a user which has requested image recognition.

As described above with reference to FIG. 1, whether the result of image recognition is either successful or unsuccessful, the conventional imaging system does not inform the user of the relevant state thereof.

In particular, when the imaging system results in an unsuccessful image recognition, it is problematic that the imaging system does not inform the user of a cause of the failure in the image recognition.

SUMMARY OF THE INVENTION

Accordingly, the present invention has been made to solve the above problems occurring in the prior art, and it is an object of the present invention to provide a method and an apparatus for perceiving a cause of an image recognition error and for informing a user of the image recognition error when the error is incurred in the process of image recognition.

In order to accomplish this object, there is provided a method for informing a user of an image recognition error in an imaging system, including generating image data by taking a picture of an object of recognition if image recognition is requested by a user, calculating analysis indices corresponding to environmental factors by detecting from the image data the environmental factors that may cause image recognition errors, determining whether the analysis indices are suitable for image recognition by checking whether each of the analysis indices is included in or excluded from a normal range of reference values, and informing the user of the cause of the image recognition error after perceiving that each of the environmental factors corresponding to the analysis indices excluded from the normal range of the reference values is a cause of the image recognition error if any of the analysis indices are excluded from the normal range of the reference values.

According to the present invention, there is provided an apparatus for informing a user of an image recognition error in an imaging system, including an image analyzing unit for calculating analysis indices corresponding to environmental factors by detecting from input image data the environmental factors that may cause the image recognition errors, for outputting a cause of the image recognition error after perceiving that each of the environmental factors corresponding to the analysis indices excluded from the normal range of reference values is the cause of the image recognition error if any of the analysis indices are excluded from the normal range of the predetermined reference values, and for outputting the image data to an image processing unit if all of the analysis indices are included in the normal range of the predetermined reference values, an image processing unit for searching previously stored image data for image data including an object of recognition of the image data, for calculating a recognition reliability corresponding to the reliability of an outcome resulting from comparing the searched image data with the image data, and for outputting the cause of the recognition error after rechecking the cause thereof through the analysis indices if the recognition reliability is less than a reference reliability, and a control unit for controlling the image analyzing unit and the image processing unit if image recognition is requested by the user, and for informing the user of the cause of the recognition error provided by the image analyzing unit or by the image processing unit.

BRIEF DESCRIPTION OF THE DRAWINGS

The above and other objects, features, and advantages of the present invention will be more apparent from the following detailed description taken in conjunction with the accompanying drawings, in which.

DETAILED DESCRIPTION OF THE PREFERRED EMBODIMENTS

Figure 1:
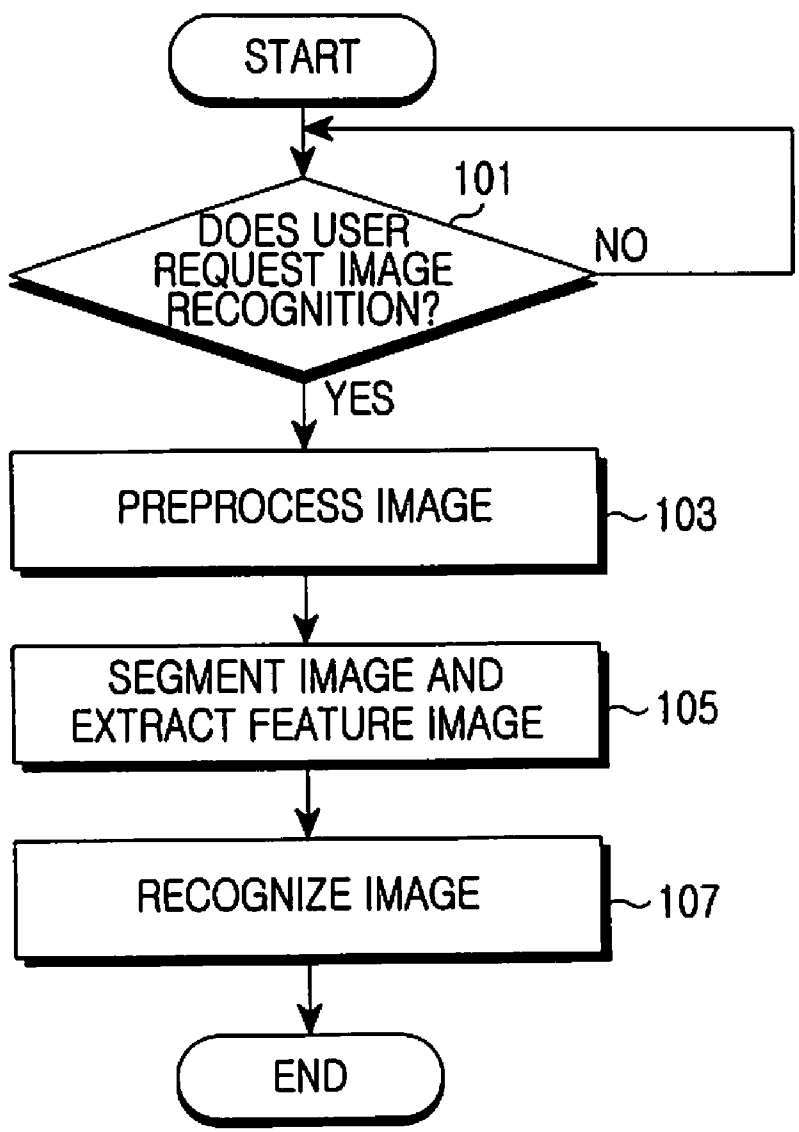
FIG. 1 illustrates an operation of image recognition of a conventional imaging system.

Hereinafter, preferred embodiments of the present invention will be described with reference to the accompanying drawings. In the following description, the same elements will be designated by the same reference numerals although they are shown in different drawings. Further, in the following description of the present invention, a detailed description of known functions and configurations incorporated herein will be omitted for the sake of clarity and conciseness.

When an image recognition error is incurred in the present invention, an imaging system perceives the cause of the image recognition error, and informs a user of the cause. The imaging system according to the present invention also informs the user of the cause of the recognition error incurred by an environmental factor among the causes of the recognition errors.

The environmental factors imply external causes which have influences on image recognition of image data, and includes for example, an illumination state and a size state of the image data, and an angle state of an object of recognition. More specifically, when the illumination state of the image data is brighter than a first value or darker than a second value, the imaging system cannot perform image recognition. Also when the size state of the image data is smaller than a prescribed size, the imaging system cannot perform image recognition. Furthermore, the imaging system cannot perform image recognition by environmental factors other than the states of illumination, size of the image data, and the angle state of the object of recognition, either.

To be more recognizable the environmental factors can be limited to the factors such as the states of illumination, size of the image data, and the angle state of the object of recognition. It will now be considered that the imaging system of the present invention informs the user that the environmental factors cause the image recognition errors.

Figure 2:
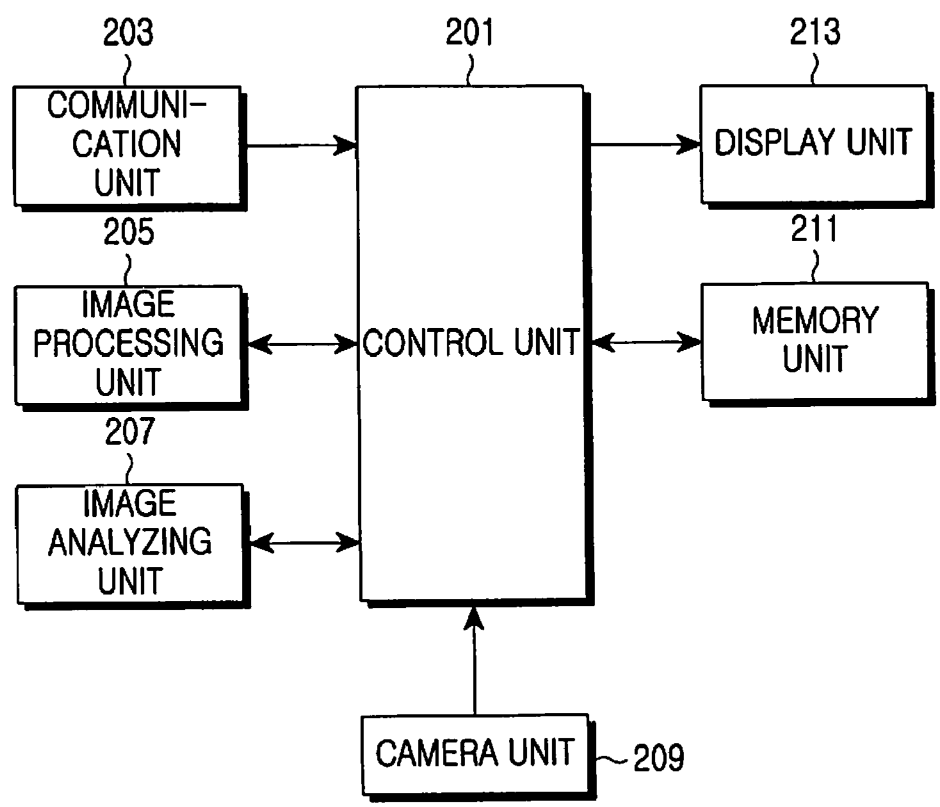
FIG. 2 illustrates an imaging system according to the present invention.

FIG. 2 illustrates an imaging system according to the present invention. Referring to FIG. 2, a description will be given to the operations of the units configuring the imaging system of the present invention.

The imaging system includes a control unit 201, a communication unit 203, an image processing unit 205, an image analyzing unit 207, a camera unit 209, a memory unit 211, a display unit 213 and a key input unit (not shown).

The communication unit 203 performs a communication function with any external apparatus. Particularly, the communication unit 203 transmits the image data to any external apparatus or receives the image data from any external apparatus. Under the control of the control unit 201, the camera unit 209 takes a picture of an inanimate or an animate object to generate the image data. Under the control of control unit 201, the display unit 213 displays a current state and an operation state of the imaging system and the image data, and generally can be constructed with a Liquid Crystal Display (LCD) or Organic Light Emitting Diodes (OLED). The key input unit (not shown) includes numeric keys, including a * key and a # key, for image processing, and other various types of well-known function keys, and generates a key signal in response to a key pressed by the user to provide to the control unit 201.

The memory unit 211 preserves data required to control the imaging system. In particular, the memory unit 211 stores learning data for calculating reference values required to check whether image recognition can be suitably performed, and recognition data required to perform a function of image recognition.

The learning data is for calculating the reference values required to determine whether image recognition can be suitably performed. For instance, the learning data can be a set of arbitrary image data, and can be a set of arbitrary feature image data which is extracted from the image data. In addition, the learning data can be classified into analysis learning data and reliability learning data. Herein, the analysis learning data can be classified into a set of recognition suitable data and a set of recognition unsuitable data. The reliability learning data can be classified into a set of reliability suitable data and a set of reliability unsuitable data.

Figure 3:
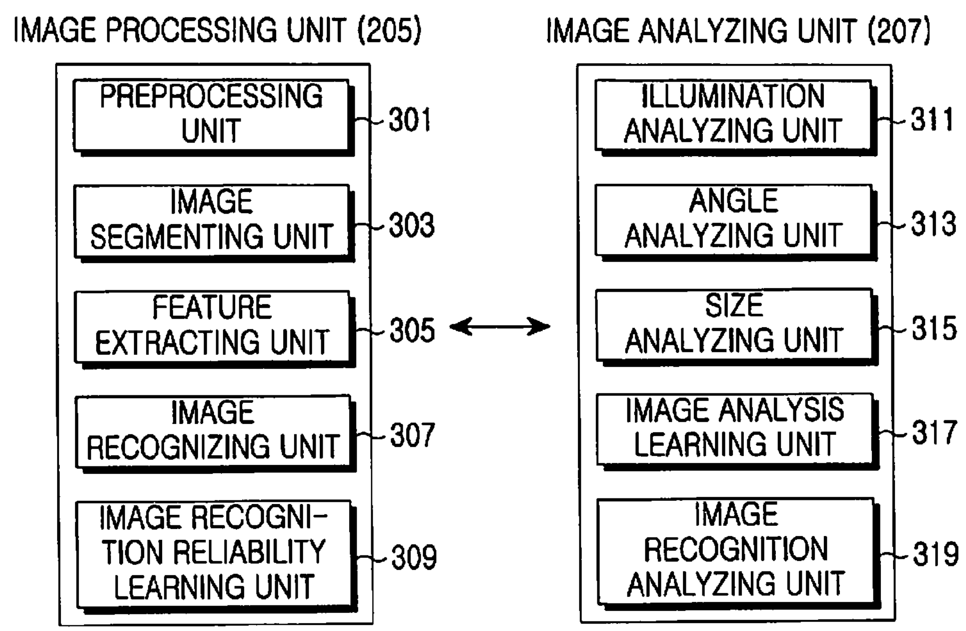
FIG. 3 illustrates an image processing unit and an image analyzing unit included in the imaging system according to the present invention.

A set of recognition suitable data is data that has been already perceived to be suitable for image recognition by an image recognizing unit 307 (Refer to FIG. 3). Furthermore, A set of recognition suitable data can be arbitrary image data, and can be also feature image data extracted from the arbitrary image data. A set of recognition unsuitable data is a set of data that has been previously perceived to be unsuitable for image recognition by an image recognizing unit 307. Furthermore, a set of recognition unsuitable data can be arbitrary image data, and can also be feature image data extracted from the arbitrary image data.

A set of reliability suitable data is data that has been previously perceived to be suitable for image recognition by an image recognizing unit 307 and by an image recognition analyzing unit 319 (Refer to FIG. 3). Furthermore, set of reliability suitable data can be arbitrary image data, and can also be feature image data extracted from the arbitrary image data. A set of reliability unsuitable data is data that has been previously perceived to be suitable for image recognition by an image recognition analyzing unit 319 but has been previously perceived to be unsuitable for image recognition by an image recognizing unit 307. Furthermore, set of reliability unsuitable data can be arbitrary image data, and can be also feature image data which is extracted from the arbitrary image data.

When the image recognizing unit 307 performs a function of image recognition, the recognition data is compared with the feature image data of the image data which is input to the image recognizing unit 307. Thus, the recognition data can be arbitrary image data or feature image data of the arbitrary image data. Further, when the recognition of a face is performed during image recognition, the recognition data can be registered by the user.

The image processing unit 205 preprocesses the image data in order to perform a process of image recognition, searches for a region-of-interest including the object of recognition, and outputs to the control unit 201 image data formed by separating only a part corresponding to a searched region-of-interest from the image data. When the image data is provided by the control unit 201, the image processing unit 205 performs the function of image recognition. Then, the image analyzing unit 207 analyzes the image data provided by the control unit 201, and perceives whether the image data is suitable for image recognition.

FIG. 3 illustrates the image processing unit and the image analyzing unit included in the imaging system according to the present invention. Referring to FIG. 3, components which constitute the image processing unit 205 and the image analyzing unit 207 will be described.

The image processing unit 205 includes a preprocessing unit 301, an image segmenting unit 303, a feature extracting unit 305, an image recognizing unit 307 and an image recognition reliability learning unit 309. The preprocessing unit 301 processes the image data provided by the control unit 201 to eliminate noise from the image data, or to adjust the luminosity of the image data to be suitable for the recognition, and outputs the preprocessed image data to the image segmenting unit 303. The image segmenting unit 303 searches the image data for the region-of-interest including the object of recognition, and segments the image data including only the searched region-of-interest. The image segmenting unit 303 outputs the segmented image data to the control unit 201.

The feature extracting unit 305 receives the segmented image data from the control unit 201, extracts the feature image data which is characteristic information required to distinguish the object of recognition, and outputs an extracted feature image data to the image recognizing unit 307. The image recognizing unit 307 receives the feature image data, and performs a function of image recognition. Specifically, the image recognizing unit 307 searches for the recognition data, and extracts the feature image data of the image data corresponding to the recognition data. At this time, the image recognizing unit 307 compares input feature image data with the feature image data which has just been extracted, and calculates the recognition reliability by using an outcome resulting from the comparison. Further, the image recognizing unit 307 compares the recognition reliability with a reference reliability set by the image recognition reliability learning unit 309. When the recognition reliability is equal to or greater than the reference reliability, the image recognizing unit 307 stores a recognition result, and can perform the remaining functions connected with image recognition. When the recognition reliability is less than the reference reliability, the image recognizing unit 307 perceives the cause of the recognition error, and informs the user of the perceived cause.

The reference reliability is a value required to determine whether image recognition is successfully performed after the function of the image recognition has been performed. If the recognition reliability is equal to or greater than the reference reliability, the image recognizing unit 307 perceives that image recognition has been successfully performed. If the recognition reliability is less than the reference reliability, the image recognizing unit 307 perceives that image recognition has been unsuccessfully performed.

The image recognition reliability learning unit 309 sets the reference reliability with the reliability learning data among the learning data which has been previously stored. For example, the image recognition reliability learning unit 309 can set up the reference reliability by using a method of maximum likelihood.

The image analyzing unit 207 includes an illumination analyzing unit 311, an angle analyzing unit 313, a size analyzing unit 315, an image analysis learning unit 317 and an image recognition analyzing unit 319.

The illumination analyzing unit 311, angle analyzing unit 313 and size analyzing unit 315 calculate analysis indices before the function of image recognition is to be performed. Analysis indices represent requisites which must be analyzed in order to perceive whether the image data is suitable for image recognition before the function of image recognition is to be performed. According to a preferred embodiment of the present invention, the number of the analysis indices is a total of ten as follows: a luminosity mean, a luminosity variance, a black-and-white pixel percentage, a segmentation luminosity mean, a segmentation luminosity variance, a segmented black-and-white pixel percentage, the number of segmented pixels, a minutia segment length, a minutia segment ratio and a minutia angle.

The illumination analyzing unit 311 receives the image data or segmented image data from the control unit 201, and analyzes the illumination state. At this time, the illumination analyzing unit 311 is now able to analyze the illumination state of the image data by calculating percentages of the luminosity mean, the luminosity variance and the number of black-and-white pixels of the image data. Upon receiving the segmented image data, the illumination analyzing unit 311 can analyze the illumination state of the segmented image data by calculating percentages of the segmentation luminosity mean, the segmentation luminosity variance and the number of segmented black-and-white pixels of the segmented image data. Upon receiving the segmented image data, the size analyzing unit 315 analyzes the size state of the segmented image data. Then, the size analyzing unit 315 is now able to analyze the size state of the segmented image data by calculating the number of image pixels of the segmented image data.

Upon receiving the segmented image data, the angle analyzing unit 313 analyzes the angle state of the object of recognition. At this time, the angle analyzing unit 313 searches for the minutiae of the segmented image data, and can analyze the angle state of the object of recognition with coordinates of a searched minutia. Considering when the angle state is analyzed in a face recognition, which is a type of image recognition, the angle analyzing unit 313 calculates the coordinates of the eyes and mouth on the face, and can calculate the minutia segment length, the minutia segment ratio, and the minutia angle by using the coordinates of the eyes and mouth.

The image analysis learning unit 317 sets the reference values required to perceive whether image recognition can be suitably performed before the function of image recognition is to be performed in the analysis learning data which has been previously stored. Specifically, the image analysis learning unit 317 sets a minimum luminosity mean, a maximum luminosity mean, a reference luminosity variance, and a reference pixel percentage required for comparison between them and the analysis index of the illumination state of the image data. Further, the Image analysis learning unit 317 sets a minimum segmentation luminosity mean, a maximum segmentation luminosity mean, a reference segmentation luminosity variance, and a reference segmented pixel percentage required for comparison between them and the analysis index of the illumination state of the segmented image data. Subsequently, the image analysis learning unit 317 sets the number of reference pixels required for comparison between it and the analysis index of the size state of the segmented image data. Next, the image analysis learning unit 317 sets up a reference minutia segment length, a minimum minutia segment ratio, a maximum minutia segment ratio, and a reference minutia angle, required for comparison between them and the analysis index of the angle state of the object of recognition of the segmented image data.

The image recognition analyzing unit 319 searches for the reference values calculated by the image analyzing learning unit 317 and for the analysis indices calculated by the illumination analyzing unit 311, by the angle analyzing unit 313, and by the size analyzing unit 315. The image recognition analyzing unit 319 then compares the analysis indices with the reference values according to requisites for image recognition, and perceives whether the analysis indices are suitable for image recognition. Herein, if any one of the analysis indices fail to meet the requisites for image recognition, the image recognition analyzing unit 319 perceives that the environmental factors, corresponding to the analysis indices which fail to meet the requisites, are the causes of the recognition errors and informs the user of the causes.

Figure 6:
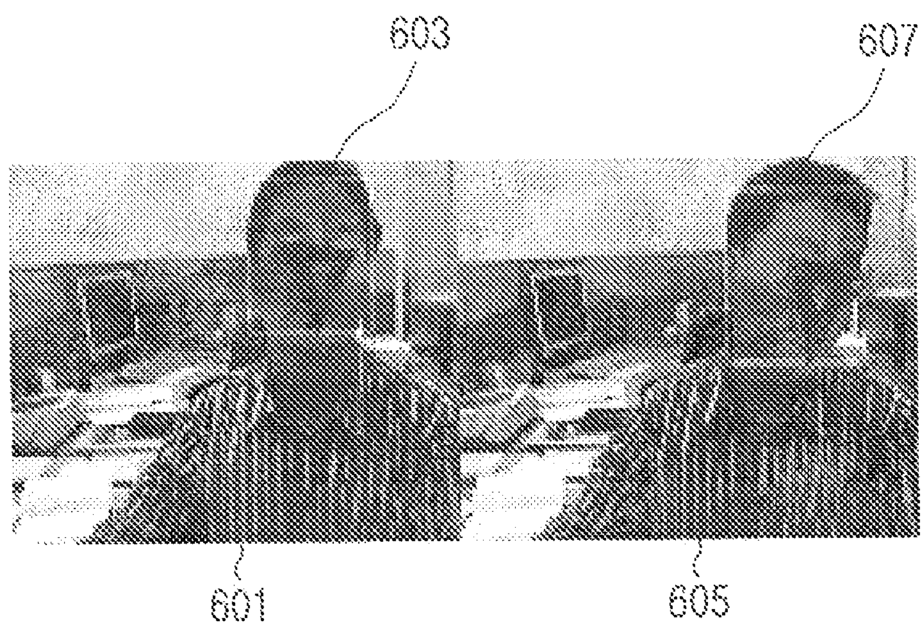
FIG. 6 illustrates the conception of a picture image of a face according to the present invention.
Figure 7:
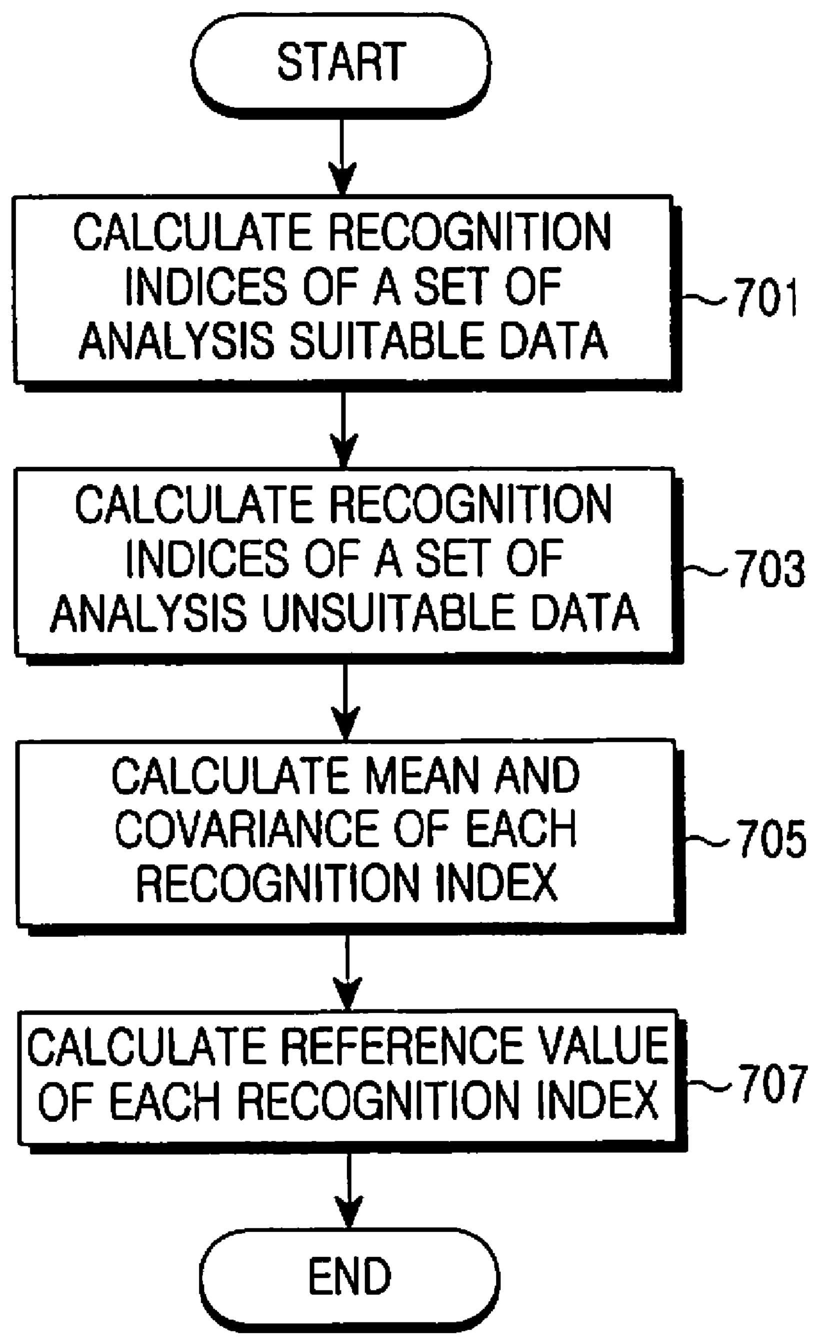
FIG. 7 illustrates a calculation of each reference value needed for checking whether image recognition can be suitably performed according to the present invention.

FIG. 7 illustrates that reference values are set up with a set of analysis learning data according to the present invention. With reference to FIGS. 1 to 7, a procedure in which the analysis learning unit 317 sets the reference values of the analysis indices will be described as follows.

The learning data is needed to calculate the reference values required to determine whether image recognition can be suitably performed. For example, the learning data can be a set of arbitrary image data, or a set of arbitrary feature image data extracted from the image data. In addition, the learning data can be classified into analysis learning data and reliability learning data. Herein, the analysis learning data can be classified into a set of recognition suitable data and a set of recognition unsuitable data. The reliability learning data can be classified into a set of reliability suitable data and a set of reliability unsuitable data.

A set of the recognition suitable data is data that the image recognizing unit 307 has previously suitable data can be arbitrary image data, or feature image data which is extracted from the arbitrary image data. A set of the recognition unsuitable data is a set of data that the image recognition unit 307 has previously perceived to be unsuitable for image recognition. In addition, a set of the recognition unsuitable data can be arbitrary image data, or feature image data extracted from the arbitrary image data.

A set of the reliability suitable data is data that has been previously perceived to be suitable for image recognition by the image recognition analyzing unit 319 and the image recognizing unit 307, and also corresponds to data having a reliability is greater than a reference reliability. A set of the reliability suitable data can be arbitrary image data, or feature image data extracted from the arbitrary image data. A set of the reliability unsuitable data is data that the image recognition analyzing unit 319 has previously perceived to be suitable for image recognition or a set of data that the image recognizing unit 307 has previously perceived to be unsuitable for image recognition, and whose reliability that is less than a reference reliability. Herein, a set of the reliability unsuitable data can be arbitrary image data, or feature image data extracted from the arbitrary image data.

Particularly, after performing a process of image recognition, based on a result of image recognition, the analysis learning data stores the image data in the memory unit 211 to be able to update it. Specifically, after performing the process of image recognition, if the results are successful, relevant image data can be stored in the memory unit 211 as the recognition suitable data. If the results are unsuccessful, relevant image data can be stored in the memory unit 211 as the recognition unsuitable data.

After performing the process of image recognition, based on a reliability of the image data, the reliability learning data stores the image data in the memory unit 211 to update the data.

It will now be considered that a process of setting a reference value has been performed before the user requests image recognition, and that the learning data corresponds to a set of the image data.

The control unit 201 controls the image analysis learning unit 317 of the image analyzing unit 207 to calculate the reference values required to perceive whether image recognition can be suitably performed, and sets calculated reference values.

FIG. 7 illustrates a calculation of each reference value needed for checking whether image recognition can be suitably performed according to the present invention. Hereinafter, with reference to FIG. 7, a description will be given to the process where the image analysis learning unit 317 calculates the reference values.

In step 701, the image analysis learning unit 317 (refer to FIG. 3) searches for a set of the recognition suitable data which has been previously preserved. Furthermore, the image analysis learning unit 317 calculates the analysis indices by using all of the image data included in a set of the recognition suitable data. According to the present invention, the number of the analysis indices is a total of ten as follows: a luminosity mean, a luminosity variance, a black-and-white pixel percentage, a segmentation luminosity mean, a segmentation luminosity variance, a segmented black-and-white pixel percentage, the number of segmented pixels, a minutia segment length, a minutia segment ratio and a minutia angle. The image analysis learning unit 317 searches a set of the recognition suitable data for arbitrary image data, and calculates all ten analysis indices by using searched image data. Additionally, the image analysis learning unit 317 allows the calculated analysis indices to be stored in such a manner that the calculated analysis indices correspond to a set of the recognition suitable data.

In step 703, the image analysis learning unit 317 searches for a set of the recognition unsuitable data which has been previously stored. After that, the image analysis learning unit 317 calculates the analysis indices by using all of the image data included in a set of the recognition unsuitable data. According to the present invention, the number of the analysis indices is a total of ten as follows: a luminosity mean, a luminosity variance, a black-and-white pixel percentage, a segmentation luminosity mean, a segmentation luminosity variance, a segmented black-and-white pixel percentage, the number of segmented pixels, a minutia segment length, a minutia segment ratio, and a minutia angle. The image analysis learning unit 317 searches a set of the recognition unsuitable data for arbitrary image data, and can calculate all ten analysis indices by using searched image data. Additionally, the image analysis learning unit 317 allows the calculated analysis indices to be stored in such a manner that the calculated analysis indices correspond to a set of the recognition unsuitable data.

In step 705, the image analysis learning unit 317 searches for all of the analysis indices preserved in manner that the analysis indices correspond to a set of the recognition suitable data, and calculates a mean, a covariance and a distribution of each of the searched analysis indices. Next, the image analysis learning unit 317 preserves a calculated mean, covariance and distribution thereof. For instance, if the luminosity variances are included in the analysis indices calculated in step 701, the image analysis learning unit 317 searches for the luminosity variance corresponding to each of image data which is a set of recognition suitable data, and calculates a mean of searched luminosity variances. Further, the image analysis learning unit 317 calculates a covariance of the luminosity variances by using the searched luminosity variances and by using the calculated mean of the luminosity variances. The image analysis learning unit 317 then calculates a distribution of the searched luminosity variances, and stores the calculated mean, the covariance and the distribution of the luminosity variances. The mean of each of the analysis indices of a set of the recognition suitable data is represented as $\mu_{s,i}$. The variance of each of the analysis indices of a set of the recognition suitable data is represented as $\sigma_{s,i}^2$. The mean of each of the analysis indices of a set of the recognition unsuitable data is represented as $\mu_{f,i}$. The variance of each of the analysis indices of a set of the recognition unsuitable data is represented as $\sigma_{f,i}^2$.

The image analysis learning unit 317 searches for each of the analysis indices preserved in the manner that the analysis indices correspond to a set of the recognition unsuitable data, and calculates the mean, the covariance, and the distribution.

In step 707, the image analysis learning unit 317 calculates the reference values by using the distribution of the analysis indices stored in step 705. For example, when it is assumed that the analysis indices of the recognition suitable data follow a normal distribution, the image analysis learning unit 317 can draw the reference values by using a method of maximum likelihood, and can set up the drawn reference values.

The method of maximum likelihood is formulated as follows.

$$p\left(x_i|H_s) \underset{D_0}{\overset{D_1}{\gtrless}} p(x_i|H_F\right)$$

In the above expression, $D_1$ represents a determination that the image data is suitable for image recognition, and $D_0$ represents a determination that the image data is unsuitable for image recognition. Herein, $p(x_i|H_S)$ represents a distribution of the i-th analysis indices of a set of the recognition suitable data, and $p(x_i|H_F)$ represents a distribution of the i-th analysis indices of a set of the recognition unsuitable data.

The image analysis learning unit 317 can draw as a reference value a part in which a distribution of the i-th analysis indices of a set of the recognition suitable data is the same as that of the i-th analysis indices of a set of the recognition unsuitable data, and set the same part to the reference value. For instance, when drawing the reference luminosity variance corresponding to the reference value of the luminosity variance, the image analysis learning unit 317 searches for a distribution of the luminosity variances of a set of the stored recognition suitable data and a distribution of the luminosity variances of a set of the stored recognition unsuitable data. Then, the image analysis learning unit 317 searches for the same parts between the distribution of the luminosity variances of a set of the recognition suitable data and the distribution of the luminosity variances of a set of the recognition unsuitable data, and sets up the reference luminosity variances with the searched parts. More specifically, each of the distribution of the luminosity variances of a set of the recognition suitable data and of the distribution of the luminosity variances of a set of the recognition unsuitable data is a normal distribution. Thus, each of a distribution curve of the luminosity variances of a set of the recognition suitable data and of a distribution curve of the luminosity variances of a set of the recognition unsuitable data is bilaterally symmetric with respect to the mean placed in the middle of a bell curve. If it is expressed in one coordinate system the distribution curves of the luminosity variances of a set of the recognition suitable data and of a set of the recognition unsuitable data, the curves will cross each other at any one point. The X-axis of the coordinate system can be the luminosity variance, and the Y-axis thereof can be the distribution. At this time, a value of the luminosity variance at which the two curves cross each other can be a value of the reference luminosity variance.

The image analysis learning unit 317 repeats the above procedures to draw the reference value of each of the analysis indices, and sets drawn reference values.

The control unit 201 controls the image recognition reliability learning unit 309 of the image processing unit 205 to calculate the reference reliability required to perceive whether image recognition is suitably performed, and sets a calculated reference reliability. The process in which the image recognition reliability learning unit 309 draws the reference reliability is the same as a process in which the image analysis learning unit 317 draws the reference values. More specifically, the image recognition reliability learning unit 309 calculates the recognition reliability by using each of the image data of a set of the reliability suitable data. The image recognition reliability learning unit 309 then calculates a mean and a distribution of the recognition reliabilities by using the calculated recognition reliabilities. Also, the image recognition reliability learning unit 309 calculates a mean and a distribution of the recognition reliabilities from each of the image data of a set of the reliability unsuitable data. It will now be assumed that each of the distribution of a set of the reliability suitable data and the distribution of a set of the reliability unsuitable data is normal distribution. By using the method of maximum likelihood, the image recognition reliability learning unit 309 sets to the reference reliability a recognition reliability of a part in which the distribution of a set of the reliability suitable data is the same as the distribution of a set of the reliability unsuitable data.

The method of maximum likelihood is formulated as follows.

$$p\left(c|H_s) \underset{D_0}{\overset{D_1}{\gtrless}} p(c|H_F\right)$$

In the above expression, $D_1$ represents a determination that the image data is suitable for image recognition, and $D_0$ represents a determination that the image data is unsuitable for image recognition. Herein, $p(c|H_s)$ represents a distribution of the recognition reliability of a set of the reliability suitable data, and $p(c|H_F)$ represents a distribution of the recognition reliability of a set of the reliability unsuitable data. The image recognition reliability learning unit 309 can draw the reference reliability from a part in which a distribution of the recognition reliability of a set of the reliability suitable data is the same as that of the recognition reliability of a set of the reliability unsuitable data, and set the reference reliability to the same part.

With reference to FIG. 2, the control unit 201 controls the units constituting the imaging system according to the present invention in order to perform the function of image recognition. Particularly, the control unit 201 controls the image processing unit 205 and the image analyzing unit 207 to perform the function of image recognition. When the user requests image recognition, the control unit 201 receives the image data from the camera unit 209 or from the communication unit 203 to provide an output thereof to the illumination analyzing unit 311 of the image analyzing unit 307. At this time, the control unit 201 controls the illumination analyzing unit 311 to analyze the illumination state. Then, the control unit 201 provides the image data to the preprocessing unit 301 of the image processing unit 205, and controls the preprocessing unit 301 to preprocess the image data. Subsequently, the control unit 201 controls the image segmenting unit 303 to segment the image data including only a region-of-interest.

The control unit 201 provides segmented image data to the illumination analyzing unit 311, and controls the illumination analyzing unit 311, the angle analyzing unit 313 and the size analyzing unit 315 to calculate analysis indices which indicate a illumination state, an angle state of the object of recognition, and a size state. Next, the control unit 201 controls the image recognition analyzing unit 319, and compares each of the analysis indices with a previously stored reference value. If the analysis indices do not entirely meet the requisites for image recognition, the control unit 201 perceives a result, corresponding to each of the analysis indices which don't meet the requisites, to be the cause of the recognition error, and informs the user of the cause. If the analysis indices entirely meet the requisites for image recognition, the control unit 201 provides the segmented image data to the feature extracting unit 305. Subsequently, the control unit 201 controls the feature extracting unit 305 to extract feature image data from the segmented image data. Further, the control unit 201 controls the image recognizing unit 307, performs the function of image recognition by using the feature image data of the segmented image data, and calculates a recognition reliability of a performance result to determine whether the feature image data of the segmented image data is suitable for image recognition through the calculated recognition reliability. If it is determined that the feature image data of the segmented image data is unsuitable for image recognition, the control unit 201 controls the image recognizing 307 to perceive the cause of the recognition error, and informs the user of the perceived cause.

Before the user requests image recognition, the control unit 201 controls the image analysis learning unit 317 to set reference values needed to perceive whether the reference values are suitable for image recognition. Then, the control unit 201 controls the image recognition reliability learning unit 309 to set the reference reliability needed to perceive whether the reference reliability is suitable for image recognition.

Figure 4:
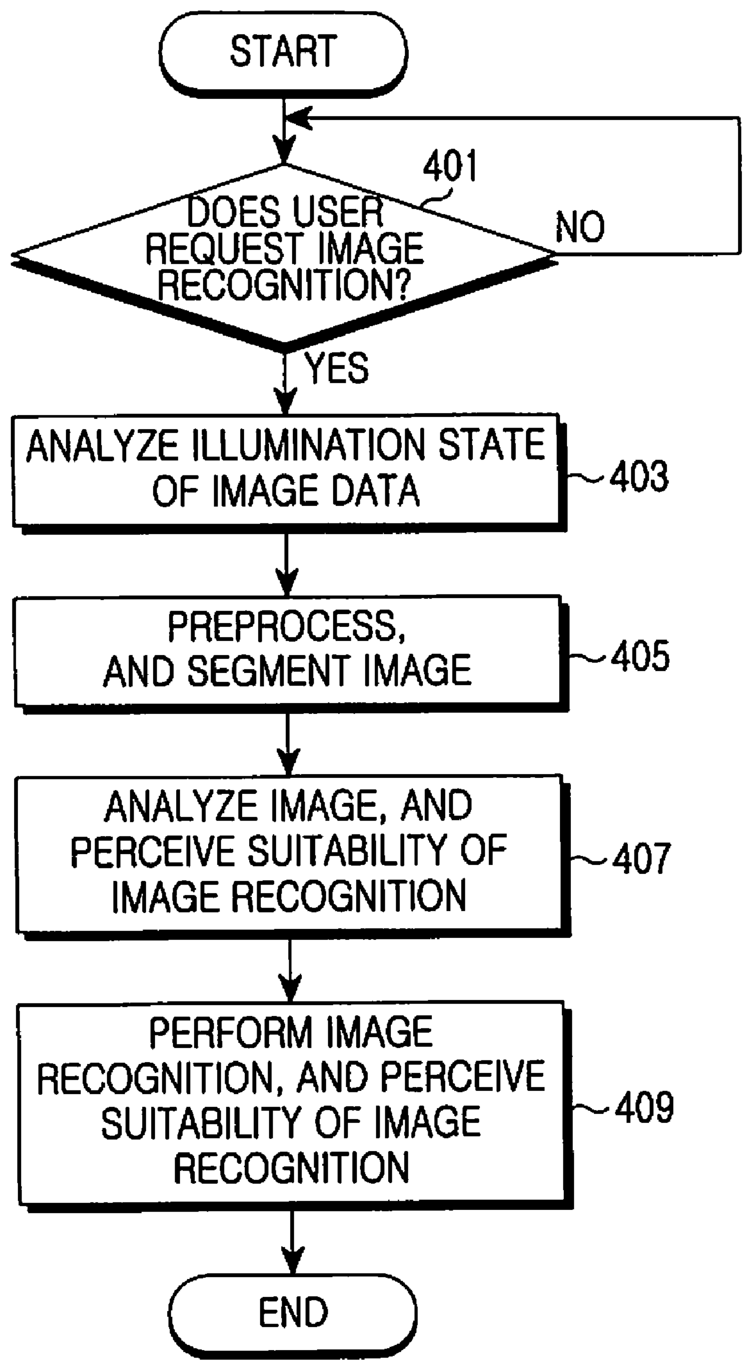
FIG. 4 illustrates an operation for performing a function of image recognition with image data according to the present invention.

FIG. 4 illustrates an operation for performing a function of image recognition with image data according to the present invention. Referring to FIGS. 2 to 4, a procedure of executing image recognition by using the image data will be described.

In step 401, if it is determined that image recognition is requested by the user, the procedure proceeds to step 403. Otherwise, if it is determined that image recognition is not requested by the user, the procedure repeats step 401.

In step 403, the illumination state of the image data is analyzed by the imaging system. In step 405, the imaging system eliminates noise from the image data or adjusts the luminosity of the image data, so that the image data can be improved in order to be suitable for image recognition. Thereafter, the imaging system establishes with the image data a region-of-interest including the object of recognition, and segments the image data including only a set region-of-interest. In step 407, the imaging system analyzes the illumination state and the size state of the segmented image data, and the angle state of the object of recognition. Then, the imaging system determines whether the segmented image data is suitable for image recognition through the analyzed results. If it is determined that the segmented image data is suitable for image recognition through the analyzed results, the procedure proceeds to step 409. If it is determined that the segmented image data is unsuitable for image recognition, the imaging system perceives the cause of the recognition error, and informs the user of the cause.

In step 409, the imaging system performs the function of image recognition by using the segmented image data, and calculates the recognition reliability of a performed outcome. Next, the imaging system determines whether the segmented image data is suitable for image recognition through the recognition reliability. If it is determined that the segmented image data is suitable for image recognition through the recognition reliability, the imaging system carries out the next remaining functions. If it is determined that the segmented image data is unsuitable for image recognition, the imaging system perceives the cause of the recognition error, and informs the user of the cause.

Figure 5:
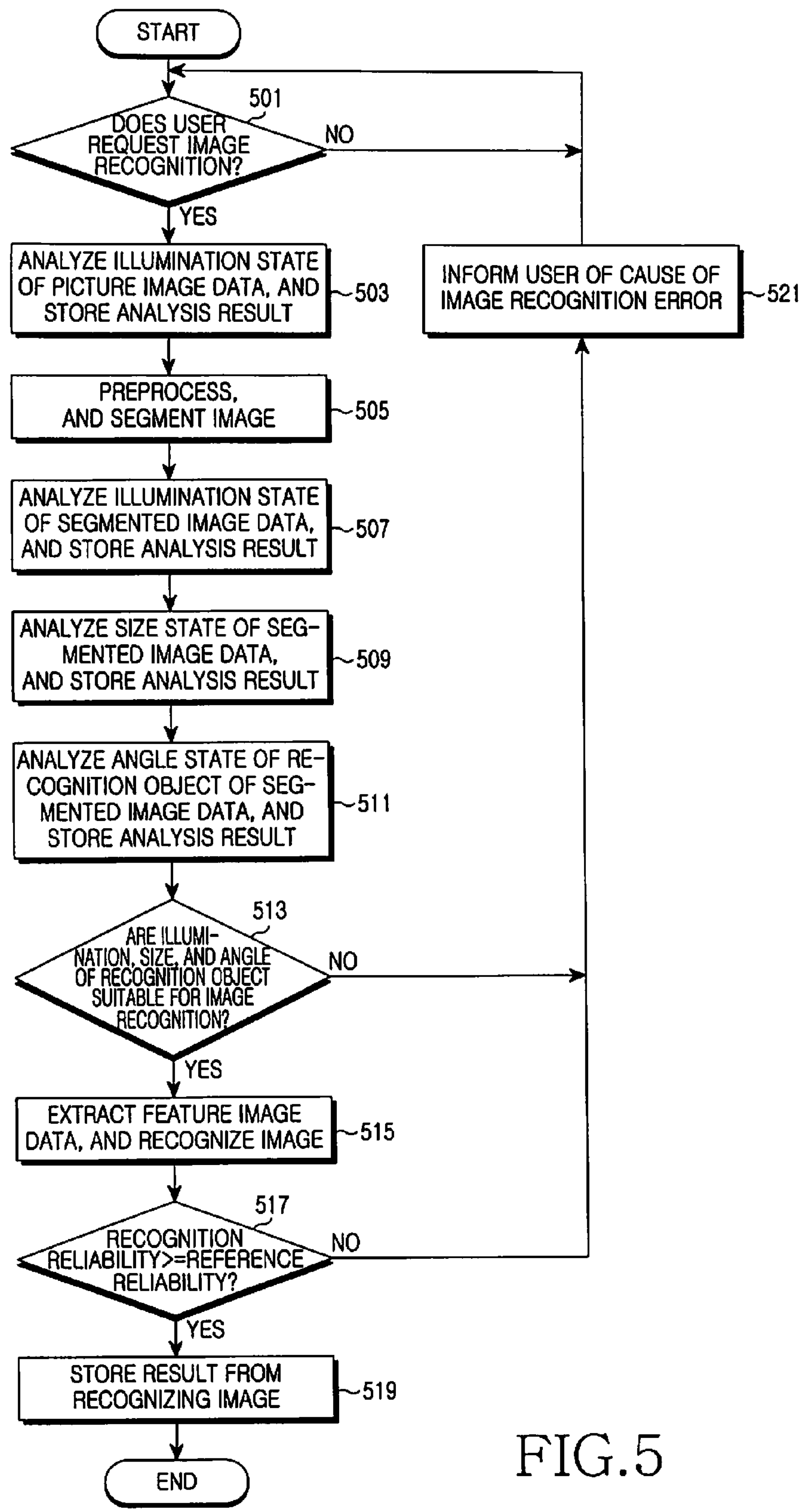
FIG. 5 illustrates an operation for informing a user of a cause of an image recognition error by perceiving the cause of the image recognition error with the image data of according to the present invention.

FIG. 5 illustrates an operation for informing a user of a cause of the image recognition error by perceiving the cause of the image recognition error with the image data of according to the present invention. With reference to FIGS. 2 to 5, a description will be given to a procedure of informing the user of the cause of the image recognition error when the imaging system perceives the cause of the image recognition error.

If image recognition is requested by the user in step 501, the control unit 201 proceeds to step 503. If image recognition is not requested by the user, the procedure repeats step 501.

In step 503, the control unit 201 receives image data required to perform the process of image recognition and outputs the image data to the illumination analyzing unit 311 of the image analyzing unit 207. At this time, the control unit 201 controls the illumination analyzing unit 311 to analyze the illumination state of the image data by calculating analysis indices. Thereafter, the control unit 201 stores calculated analysis indices. According to this embodiment the present invention, the analysis indices corresponding to the illumination state may be designated only as the luminosity mean, the luminosity variance, and the percentage of the number of black-and-white pixels. The entire image data may be brighter than a first value or darker than a second value depending on the illumination state. Furthermore, if a part of the image data is bright, whereas another part of the image data is dark, then luminosity contrast can occur more than a prescribed value. As image data is not suitable for image recognition, the illumination analyzing unit 311 analyzes the luminosity and the luminosity contrast of the received image data, and also analyzes whether backlight of the illumination occurs.

Therefore, the illumination analyzing unit 311 calculates the luminosity mean, the luminosity variance, and the percentage of the number of black-and-white pixels of the image data to analyze the illumination state. For example, when the image data is constructed with 4×4 pixels, and when the range of the luminosity is 3 bits, the illumination analyzing unit 311 can calculate the luminosity mean if the luminosities of the pixels are sequentially 3, 4, 5, 2, 1, 3, 4, 4, 2, 3, 3, 2, 5, 3, 3, and 3, respectively. The above-mentioned luminosity mean equals (50/16)=3.125. As it is usual that the image of the object of recognition places in the center of the picture image, the illumination analyzing unit 311 can calculate the luminosity mean by giving a weight to the luminosity value of the 2×2 pixels. Among the above-mentioned luminosity values corresponding to the 4×4 pixels, to evaluate the mean by multiplying weight 2 by the luminosity value corresponding to the center pixels, the mean equals 3.9375 from the calculation expression as follows.

$$(3+4+5+2+1+(3\times2)+(4\times2)+4+2+(3\times2)+(3\times2)+2+5+3+3+3)/16=3.9375$$

Next, the illumination analyzing unit 311 calculates the luminosity variance by using the luminosity values and luminosity mean of the image data. The luminosity variance represents the luminosity contrast of the image data. For instance, if the luminosity mean equals 4 at present while using the above luminosity values, the luminosity variance equals 1.875 from the calculation expression as follows.

$$(1+0+1+4+9+1+0+0+4+1+1+4+1+1+1+1)/16=1.875$$

The illumination analyzing unit 311 calculates the percentage of the pixels respectively corresponding to white and black among the luminosities respectively corresponding to pixels of the image data. Thus, the white pixels or the black pixels are produced more than usual image data among the image data generated when the illumination is in a state of backlight. Therefore, the illumination analyzing unit 311 calculates the number of black-and-white pixels of the image data and then the percentage of the number of black-and-white pixels per the total number of pixels. For example, when the image data constructed with 4×4 pixels has a luminosity range of 3 bits, a luminosity of 0 corresponding to white, and a luminosity of 7 corresponding to black, the illumination analyzing unit 311 can calculate the number of black-and-white pixels of 8 by adding the number of pixels of 4 through the luminosity of 7 to the number of pixels of 4 through the luminosity of 0. Next, the illumination analyzing unit 311 calculates the percentage of the number of black-and-white pixels obtained from among the total number of pixels as follows.

$$8/16\times100=50[\%]$$

Subsequently, the control unit 201 stores the currently calculated luminosity mean, luminosity variance, and percentage of the number of black-and-white pixels of the image data.

In step 505, the control unit 201 provides the image data to the preprocessing unit 301 of the image processing unit 205. The control unit 201 controls the preprocessing unit 301 and image segmenting unit 303 to improve or segment the image data to produce image data suitable for image recognition. Under the control of the control unit 201, the preprocessing unit 301 eliminates the noise of the image data or improves the data to have a brightness suitable for image recognition, and outputs them to the image segmenting unit 303. Under the control of the control unit 201, the image segmenting unit 303 sets the region-of-interest including the object of recognition among the image data, and produces the segmented image data including only the region-of-interest from the image data.

In step 507, the control unit 201 provides the segmented image data to the illumination analyzing unit 311 of the image analyzing unit 207. Next, the control unit 201 controls the illumination analyzing unit 311 to calculate the analysis indices to analyze the illumination state of the segmented image data. Then, the control unit 201 stores the calculated analysis indices. According to this embodiment, the analysis indices corresponding to the illumination state are designated only the segmentation luminosity mean, the segmentation luminosity variance and the number of segmented black-and-white pixels.

When analyzing the illumination state of the segmented image data, the illumination analyzing unit 311 calculates the segmentation luminosity mean, the segmentation luminosity variance, and the percentage of the number of segmented black-and-white pixels in the same scheme by which it has analyzed the illumination state of the image data in step 503. For instance, if the segmented image data constructed with 2×2 pixels has the range of the luminosity of 3 bits, and has the luminosities of the pixels of 3, 4, 3, and 3, the illumination analyzing unit 311 can calculate the segmentation luminosity mean as 3.25 from such a calculation expression as (13/4)=3.25. Then, the illumination analyzing unit 311 calculates the segmentation luminosity variance by using luminosities and the calculated segmentation luminosity mean of the segmented image data. For example, if the segmentation luminosity mean equals 3, the segmentation luminosity variance can be evaluated from such a calculation expression as (0+1+0+0)/4=0.25. Subsequently, the illumination analyzing unit 311 computes the percentage of the number of the pixels respectively corresponding to black and white among the luminosities respectively corresponding to the pixels of the segmented image data. For example, when the image data constructed with 2×2 pixels has the range of the luminosity of 3 bits, has the luminosity of 0 corresponding to white, and has the luminosity of 7 corresponding to black, if the luminosities of the pixels are sequentially 3, 7, 4, and 0, respectively, the illumination analyzing unit 311 can compute the number of black-and-white pixels of 2 by adding the number of pixels of 1 through the luminosity of 7 to the number of pixels 1 through the luminosity of 0. Then, the illumination analyzing unit 311 can evaluate the percentage of the number of segmented black-and-white pixels among the total number of pixels from such a calculation expression as 2/4×100=50[%]. Next, the control unit 201 stores the currently calculated segmentation luminosity mean, segmentation luminosity variance, and percentage of the number of segmented black-and-white pixels of the segmented image data.

In step 509, the control unit 201 outputs the segmented image data to the size analyzing unit 315. Subsequently, the control unit 315 controls the size analyzing unit 315 to calculate the analysis indices to analyze the size state of the segmented image data. Next, the control unit 201 stores the calculated analysis indices. According to this embodiment, the analysis index corresponding to the size state of the segmented image data is designated the number of image pixels.

If the size of the segmented image data is equal to or less than a reference value, the control unit 201 cannot extract feature image data from the segmented image data. Accordingly, the control unit 201 controls the size analyzing unit 315 to compute the size of the segmented image data, and allows a computed size to be stored. For instance, the size analyzing unit 315 can evaluate the size of the segmented image data as the number of pixels. Herein, the number of pixels is referred to as "the number of image pixels."

In step 511, the control unit 201 provides the segmented image data to the angle analyzing unit 313. Thereafter, the control unit 313 controls the angle analyzing unit 313 to compute the analysis indices to analyze the angle state of the object of recognition included in the segmented image data. As the image data is usually data related to two-dimensional images, the angle state of the object of recognition causes cases in which the angle analyzing unit 313 cannot extract the feature image data required to perform the process of image recognition. Thus, before extracting the feature image data from the segmented image data, the control unit 201 enables the angle analyzing unit 313 to calculate the analysis indices corresponding to the angle state of the object of recognition, and stores the calculated analysis indices. According to this embodiment of the present invention, the analysis indices according to the angle state of the object of recognition are designated the minutia segment length, the minutia segment ratio and the minutia angle.

When analyzing the angle state of the object of recognition, the angle analyzing unit 313 extracts more than one minutia of the object of recognition, and computes the angle of the object of recognition by using the extracted minutiae. When a procedure for calculating a face angle is executed in the process of a face recognition which is a type of image recognition, when the eyes and mouth have been already designated minutiae, on receiving the segmented image data, the angle analyzing unit 313 is able to detect the eyes and mouth from face image data. Then, the angle analyzing unit 313 can express the coordinates of the detected eyes as an X coordinate and an Y coordinate, and can likewise express a coordinate of the detected mouth. Herein, the angle analyzing unit 313 bisects the detected two X coordinates of the two eyes, and can calculate a central X coordinate. Next, the angle analyzing unit 313 computes the lengths of a segment between the two eyes and of a segment between the left eye and the mouth. Herein, the segment between the two eyes, the segment between the left eye and the mouth, and a segment between the right eye and the mouth are referred to as a first, a second and a third segment, respectively.

Because the face inclined on the left or on the right is unsuitable for image recognition, the angle analyzing unit 313 calculates the difference between the calculated central X coordinate between the two eyes and the calculated X coordinate of the mouth, which is referred to as "a minutia segment length." If the face is inclined upwards or downwards, even though the face is not inclined on the left or on the right, it is unsuitable for image recognition. For these reasons, the angle analyzing unit 313 calculates the length ratio of the first segment between the two eyes to the second segment between the left eye and the mouth, which is referred to as a minutia segment ratio. Subsequently, the angle analyzing unit 313 calculates a minutia angle formed between the first segment and a set horizontal line. The angle analyzing unit 313 designates the minutiae of the object of recognition, and calculates the minutia segment length, the minutia segment ratio, and the minutia angle in terms of the designated minutiae. The control unit 201 stores the calculated minutia segment length, minutia segment ratio, and minutia angle.

In step 513, the control unit 201 controls the image recognizing unit 319 to determine whether the analysis indices are suitable for image recognition, wherein the analysis indices include the illumination state of the image data, the illumination state and the size state of the segmented image data, and the angle state of the object of recognition. If the control unit 201 receives from the image recognition analyzing unit 319 a resultant determination that the segmented image data is suitable for image recognition, then the procedure proceeds to step 515. If it is determined that the segmented image data is unsuitable for image recognition, the control unit 201 perceives the cause of the image recognition error, and the procedure proceeds to step 521.

When perceiving whether the image data is suitable for image recognition, the image recognition analyzing unit 319 uses the index indices stored in steps 503, 507, 509 and 511.

Particularly, the image recognition analyzing unit 319 searches for the luminosity mean, the luminosity variance and the percentage of the number of black-and-white pixels of the image data stored in step 503. Then, the image recognition analyzing unit 319 checks whether the luminosity mean lies between a minimum luminosity mean and a maximum luminosity mean, both of which are designated by the image recognition learning unit 317. The image recognition analyzing unit 319 checks whether the luminosity variance is equal to or less than the reference luminosity variance designated by the image recognition learning unit 317. Subsequently, the image recognition analyzing unit 319 perceives whether the percentage of the number of black-and-white pixels is equal to or less than the percentage of reference pixels designated by the image recognition learning unit 317.

After that, the image recognition analyzing unit 319 searches for the segmentation luminosity mean, the segmentation luminosity variance, and the percentage of the number of black-and-white pixels of the segmented image data preserved in step 507. Then, the image recognition analyzing unit 319 checks whether the segmentation luminosity mean lies between the minimum segmentation luminosity mean and the maximum segmentation luminosity mean, both of which are designated the image recognition learning unit 317. Subsequently, the image recognition analyzing 319 checks whether the segmentation luminosity variance is equal to or less than the reference segmentation luminosity variance designated by the image analysis learning unit 317. Next, the image recognition analyzing unit 319 perceives whether the percentage of the number of the segmented black-and-white pixels is equal to or less than the percentage of the segmented reference pixels designated by the image recognition learning unit 317.

Subsequently, the image recognition analyzing unit 319 searches for the number of image pixels of segmented image data preserved in step 509. Then, the image recognition analyzing unit 319 checks whether the number of the image pixels is equal to or less than the number of the reference pixels designated by the image analysis learning unit 317. Next, the image recognition analyzing unit 319 searches for the minutia segment length, minutia segment ratio, and minutia angle of the segmented image data stored in step 511. Thereafter, the image recognition analyzing unit 319 perceives whether the minutia segment length is equal to or shorter than the reference minutia segment length designated by the image analysis learning unit 317. Then, the image recognition analyzing unit 319 perceives whether the minutia segment ratio lies between the minimum minutia segment ratio and the maximum minutia segment ratio, both of which are designated by the image analysis learning unit 317. In addition, the image recognition analyzing unit 319 perceives whether the minutia angle is equal to or smaller than the reference minutia angle designated by the image analysis learning unit 317.

The image recognition analyzing unit 319 produces data for perceiving the recognition error (hereinafter, recognition error perception data) including if the above-mentioned ten recognition conditions are satisfied to provide the recognition error perception data to the control unit 201. Then, the control unit 201 receives the recognition error perception data in order to analyze them. Next, depending on a resultant analysis, if it is determined that the ten recognition conditions are completely satisfied, the control unit 201 proceeds to step 515. If any of the ten recognition conditions are not satisfied, then the control unit 201 perceives that the unsatisfied recognition conditions are the causes of the recognition errors, and the control unit 201 proceeds to step 521. For example, if the segmentation luminosity variance of the segmented image data out of the ten recognition conditions is equal to or greater than the reference segmentation luminosity variance, the image recognition analyzing unit 319 produces recognition error perception data containing information on the above dissatisfaction of the segmentation luminosity variance, and outputs them to the control unit 201. Next, the control unit 201 analyzes the recognition error perception data to perceive that a luminosity contrast indicated by the segmentation luminosity variance is a cause of the recognition error, and proceeds to step 521.

In step 515, the control unit 201 controls the feature extracting unit 305 of the image processing unit 205 to extract singular feature image data which is able to cause the object of recognition to be distinguished from the segmented image data. Subsequently, the control unit 201 controls the image recognizing unit 307 to perform the function of image recognition. Specifically, the image recognizing unit 307 searches for the recognition data which has been previously stored. Then, the image recognizing unit 307 extracts the feature image data from the image data of the recognition data. Subsequently, the image recognizing unit 307 compares the feature image data of the image data of the recognition data with the feature image data extracted from the segmented image data, and computes the recognition reliability of image recognition. Further, the image recognizing unit 307 sets as a representative recognition reliability the recognition reliability having a higher value than any other calculated recognition reliability. For instance, the image recognizing unit 307 compares the tone of color of the feature image data of the segmented image data with the tone of color of the feature image data of the image data stored in advance, checks whether the two tones of color thereof agree with each other, and is then able to calculate the recognition reliability. Specifically, if the feature image data of the segmented image data, constructed with 2×2 pixels, has a color tone bit of one bit, color tone bits of pixels of the feature image data such as 1, 0, 1, and 0, and color tone bits of pixels of the feature image data of the image data stored in advance such as 1, 0, 0, and 0, then the control unit 201 can compute a recognition reliability of 75[%].

In step 517, the control unit 201 controls the image recognizing unit 307 to perceive whether the performance of image recognition has resulted in a reliable outcome. The image recognizing unit 307 compares the representative recognition reliability in step 515 with a reference reliability designated by the image recognition reliability learning unit 309, produces reliability data including an outcome resulting from the comparison, and outputs the reliability data to the control unit 201. Subsequently, the control unit 201 receives and analyzes the reliability data from the image recognizing unit 307. Depending on the result of the analysis, if the representative recognition reliability is equal to or greater than the reference reliability, the control unit 201 proceeds to step 519. If not, then the control unit 201 perceives the cause of, the recognition error, and proceeds to step 521.

In order to perceive the cause of the recognition error, the control unit 201 uses an algorithm of a Mahalanobis distance. The control unit 201 searches for the ten analysis indices calculated in steps 503, 507, 509, and 511, evaluates analysis indices of the analysis suitable learning data corresponding to the ten analysis indices, searches for the stored means and standard deviations, and calculates the Mahalanobis distance. The control unit 201 searches for the longest of the calculated Mahalanobis distances, perceives to be the cause of the recognition error each of the environmental elements corresponding to the analysis indices substituted for evaluating a searched Mahalanobis distance, and proceeds to step 521.

An analysis index maximizing the Mahalanobis distance can be obtained from an expression defined as follows:

$$i = \arg\max_{j = 1, 2, \ldots, N} \left| \frac{x_j - \mu_{s,j}}{\sigma_{s,j}} \right|$$

In the above expression, $x_j$ is a variable representing an analysis index required to perceive the suitability of image recognition. For $x_j$, any of the luminosity mean, the luminosity variance, the percentage of black-and-white pixels, the segmentation luminosity mean, the segmentation luminosity variance, the percentage of segmented black-and-white pixels, the number of segmented pixels, the minutia segment length, the minutia segment ratio, and the minutia angle may be sequentially substituted. $\mu_{s,j}$ and $\sigma_{s,j}$ represent values designated by the image analysis learning unit 317. $\mu_{s,j}$ is a variable representing a mean corresponding to the analysis index. $\sigma_{s,j}$ is a variable representing a standard deviation corresponding to the analysis index. For instance, when the luminosity mean is substituted for $x_j$, for $\mu_{s,j}$, a mean calculated from luminosity means of the image data of the reliability suitable data is substituted, and for $\sigma_{s,j}$, a standard deviation of the luminosity means of the image data of the reliability suitable data is substituted. Next, the control unit 201 computes the Mahalanobis distance by using the substituted values. The control unit 201 computes the Mahalanobis distance by using all of the substituted analysis indices, and searches the computed Mahalanobis distances for the longest Mahalanobis distance. The control unit 201 searches for the analysis indices used to compute the searched Mahalanobis distance, and perceives an environmental factor corresponding to each of the analysis indices to be the cause of the image recognition error.

In step 521, the control unit 201 informs the user of the causes of the image recognition errors. For instance, if the control unit 201 perceives that the cause of the image recognition error is incurred by the brightness of the illumination, the display unit 213 displays a message such as, "The current illumination is too bright! Please go to a darker place and try performing image recognition again!," or informs the user of the message in the manner of an acoustic output.

FIG. 6 illustrates the conception of a picture image according to the present invention. With reference to FIGS. 1 to 6, it will be supposed that the imaging system according to an embodiment of the present invention images a human face as the object of recognition.

When the user requests image recognition, the imaging system receives image data 601. The imaging system computes an analysis index corresponding to an illumination state by using the image data 601. The imaging system produces from the image data 601 segmented image data 603 including only the face corresponding to a region-of-interest, and calculates from the segmented image data 603 the coordinates of the eyes and mouth corresponding to minutiae of the face recognition. From the segmented image data 603, the imaging system of the present invention computes an analysis index corresponding to an illumination state, an analysis index corresponding to a size state, and an analysis index corresponding to angle state of the face corresponding to the object of recognition. The imaging system compares the analysis indices computed until now with reference values of the analysis indices set by an operation of the image analysis learning unit 317, and checks whether an outcome resulting from the comparison satisfies each of recognition suitable requisites.

If the analysis indices are completely satisfied with the recognition suitable requisites, then the imaging system of the present invention extracts feature image data from the segmented image data 603. The imaging system compares the extracted feature image data with feature image data of the image data registered in advance in order to calculate a recognition reliability. Subsequently, the imaging system compares the calculated recognition reliability with a reference reliability set by an operation of the image recognition reliability learning unit 309. If the calculated recognition reliability is equal to or greater than the reference reliability, the imaging system perceives that image recognition is suitably performed, and stores a result of image recognition. If not, then the imaging system perceives that image recognition is unsuitably performed. Next, the imaging system informs the user of the causes of the recognition errors.

If each of the analysis indices is not satisfied with any of the recognition suitable requisites, the imaging system perceives that the unsatisfied recognition suitable requisites are the causes of the recognition errors, and informs the user that the unsatisfied recognition suitable requisites cause the recognition errors.

If the size state of the image data 601 and the angle state of the object of recognition are suitable for image recognition, but the illumination state of the image data 601 is unsuitable for image recognition, when the imaging system checks whether image recognition is performed suitably through the analysis index of the illumination state, it perceives that the analysis index of the illumination state is not satisfied with the recognition suitable requisite. Hence, the imaging system perceives that the illumination state of the image data 601 is the cause of the image recognition error, and informs the user with a message such as, “Please adjust the current state of illumination, and try performing image recognition again!”

If the states of illumination and size of the image data 601 and the angle state of the object of recognition are completely suitable for image recognition, the imaging system determines that the analysis indices of the illumination state, of the size state, and of the angle state of the object of recognition satisfy the recognition suitable requisites. In succession, the imaging system compares the feature image data of the segmented image data 603 with the feature image data of the image data stored in advance, and calculates the recognition reliability. If the calculated recognition reliability is equal to or greater than the reference reliability, the imaging system stores the result of image recognition. If not, then the imaging system perceives the causes of the image recognition errors, and can inform the user of the causes thereof.

If the states of illumination and size of the image data 605 are suitable for image recognition, the angle state of the object of recognition is unsuitable for image recognition, the imaging system perceives that the analysis index of the angle state of the object of recognition is not satisfied with the recognition suitable requisite. As a result, the imaging system perceives that the angle state of the object of recognition of the segmented image data 607 is the cause of the image recognition error, and informs the user with a message, such as “Please adjust the face angle corresponding to the angle state of the object of recognition, and try performing image recognition again!”

In the process of performing image recognition as described above, the imaging system can perceive the causes of the image recognition errors, inform the user of the perceived causes thereof, and enable the user to perform more efficient image recognition functions.

While the invention has been shown and described with reference to a certain preferred embodiment thereof, it will be understood by those skilled in the art that various changes in form and details may be made therein without departing from the spirit and scope of the invention. For instance, the present invention not only applies image recognition to the face recognition but also emphasizes the recognition of the face of a human being. However, image recognition thereof can be applied to objects other than the face of the human being. Therefore, the spirit and scope of the present invention must be defined not by described embodiments thereof but by the appended claims and equivalents of the appended claims.

What is claimed is:

1. A method for informing a user of an image recognition error in an imaging system, the method comprising the steps of:

(1) generating image data by taking a picture of an object of recognition if image recognition is requested by a user;

(2) calculating analysis indices corresponding to environmental factors by detecting from the image data the environmental factors that may cause the image recognition errors;

(3) determining whether the analysis indices are suitable for image recognition by checking whether each of the analysis indices is included in or excluded from a normal range of reference values; and (4) informing the user of the cause of the image recognition error after perceiving that each of the environmental factors corresponding to the analysis indices excluded from the normal range of the reference values is a cause of the image recognition error if any of the analysis indices are excluded from the normal range of the reference values, wherein the environmental factors include at least one among an illumination state and a size state of the image data, and an angle state of the object of recognition.

2. The method as claimed in claim 1, further comprising:

searching previously stored image data for the image data included in the object of recognition of the image data if all of the analysis indices are included in the normal range of the predetermined reference values;

calculating a recognition reliability corresponding to the reliability of an outcome resulting from comparing searched image data with the image data;

determining whether image recognition is successfully performed by comparing the recognition reliability with a reference reliability;

informing the user of the success of image recognition if the recognition reliability is equal to or greater than the reference reliability; and informing the user of the cause of the recognition error by rechecking the cause of the recognition error through the analysis indices if the recognition reliability is less than the reference reliability.

3. The method as claimed in claim, wherein the reference values are calculated in terms of a method of maximum likelihood.

4. The method as claimed in claim 1, wherein step (4) further comprises:

searching for at least one analysis index excluded from the normal range of the reference values;

designating the environmental factors corresponding to the analysis indices as causes of the recognition errors; and informing the user of each of the designated environmental factors as the cause of the errors.

5. The method as claimed in claim 1, wherein the reference reliability is calculated in terms of a method of maximum likelihood.

6. The method as claimed in claim 1, wherein step (4) further comprises:

calculating a value of a Mahalanobis distance by substituting each of the analysis indices for an expression of the Mahalanobis distance;

searching the calculated values of the Mahalanobis distances for a longest value thereof;

designating the environment factor corresponding to the searched analysis index as the cause of the recognition error after searching for the analysis index corresponding to the searched longest value; and informing the user of the designated environment factor as the cause of the recognition error.

7. An apparatus for informing a user of an image recognition error in an imaging system, the apparatus comprising:

an image analyzing unit for calculating analysis indices corresponding to environmental factors by detecting from input image data the environmental factors that cause the image recognition errors, for outputting a cause of the image recognition error after perceiving that each of the environmental factors corresponding to the analysis indices excluded from the normal range of reference values is the cause of the image recognition error if any of the analysis indices are excluded from a normal range of the reference values, and for outputting the image data to an image processing unit if all of the analysis indices are included in the normal range of the reference values;

an image processing unit for searching previously stored image data for image data including an object of recognition of the image data, for calculating a recognition reliability corresponding to the reliability of an outcome resulting from comparing the searched image data with the image data, and for outputting the cause of the recognition error after rechecking the cause of the error through the analysis indices if the recognition reliability is less than a reference reliability; and a control unit for controlling the image analyzing unit and the image processing unit if image recognition is requested by the user, and for informing the user of the cause of the recognition error provided by the image analyzing unit or by the image processing unit wherein the image analyzing unit calculates the analysis indices corresponding to the environmental factors including at least one among an illumination state and a size state of the image data, and an angle state of the object of recognition.

8. The apparatus as claimed in claim 7, wherein the image analyzing unit calculates the reference values in terms of a method of maximum likelihood.

9. The apparatus as claimed in claim 7, wherein the image processing unit calculates the reference reliability in terms of a method of maximum likelihood.

10. The apparatus as claimed in claim 7, wherein the image processing unit calculates a value of a Mahalanobis distance by substituting each of the analysis indices for an expression of the Mahalanobis distance, searches the calculated values of the Mahalanobis distances for a longest value thereof, and perceives that the environment factors corresponding to the searched analysis indices are the causes of the recognition error.

* * * * *